(12) United States Patent
Bertozzi

(10) Patent No.: US 8,308,216 B2
(45) Date of Patent: Nov. 13, 2012

(54) ADJUSTABLE CUSHIONED INTERMEDIATE SYSTEM FOR SEAT, IN PARTICULAR FOR VEHICLE SEAT

(75) Inventor: Franco Bertozzi, Druento (IT)

(73) Assignee: Iveco S.p.A. (IT)

( * ) Notice: Subject to any disclaimer, the term of this patent is extended or adjusted under 35 U.S.C. 154(b) by 23 days.

(21) Appl. No.: 12/735,056

(22) PCT Filed: Dec. 17, 2008

(86) PCT No.: PCT/IB2008/055372
§ 371 (c)(1),
(2), (4) Date: Jun. 11, 2010

(87) PCT Pub. No.: WO2009/077988
PCT Pub. Date: Jun. 25, 2009

(65) Prior Publication Data
US 2010/0253108 A1    Oct. 7, 2010

(30) Foreign Application Priority Data
Dec. 18, 2007    (EP) ..................................... 07123494

(51) Int. Cl.
*B60N 2/50*    (2006.01)
(52) U.S. Cl. .................................................. 296/65.02
(58) Field of Classification Search ............... 296/65.02, 296/65.01; 248/638
See application file for complete search history.

(56) References Cited

FOREIGN PATENT DOCUMENTS

| DE | 10258020 | 6/2004 |
|---|---|---|
| GB | 2313214 | 11/1997 |
| WO | WO 2007130153 | 11/2007 |

*Primary Examiner* — H Gutman
(74) *Attorney, Agent, or Firm* — Stetina Brunda Garred & Brucker

(57) ABSTRACT

An adjustable cushioned intermediate system for vehicle seats may have at least four shock absorbers, at least four actuators and at least one accelerometer and/or as many loading cells as shock absorbers and a control unit suitable for controlling the actuators. On the basis of the information obtained from the accelerometer and/or from the loading cells, as to oppose the stresses affecting the seat and improve the comfort of the passenger.

8 Claims, 2 Drawing Sheets

ADJUSTABLE CUSHIONED INTERMEDIATE SYSTEM FOR SEAT, IN PARTICULAR FOR VEHICLE SEAT

FIELD OF THE INVENTION

This invention relates to an adjustable cushioned intermediate system for seat, in particular for vehicle seat.

DESCRIPTION OF THE PRIOR ART

Vehicle seats, in particular heavy vehicle seats, are provided with a suspension system that is independent from, for example, the suspensions of the axles, in order to is to improve the passenger's comfort.

The seats may be standardized, and they need a support, usually called intermediate support, in order to adapt them to the different cabins, or on the contrary, to adapt different seats to the same cabin.

The seats known in the prior art are cushioned by means of springs or of pneumatic suspensions, allowing the adjustment of both their stroke and their compliance. The compliance may be adjusted until the effect of the suspension system is nullified, and the seat is rigidly constrained to the vehicle floor.

In certain conditions, the oscillation of the seat reaches a frequency near 1 Hz, which is the frequency that mostly causes sickness and especially carsickness to the passengers.

Moreover, a ravelled road surface usually causes seat oscillations which may draw the driver's feet close and away from the brake pedal and the accelerator pedal, creating annoying and dangerous effects on the braking and on the acceleration of the vehicle, so that some drivers are forced to disable the seat oscillation system of the vehicle.

An additional critical problem is due to the considerable noise produced by some intermediate system provided with pneumatic suspension, because during the compression and the decompression of one or their shock absorbers, they cause some air to go out and come in from an opening, producing an irritating hiss. An example of this kind of system is shown in GB-A-2313214, which shows a seat suspension system formed by six mechanical shock absorbers cater-cornered arranged in pairs so that they define three supporting points on the seat interposed with three supporting point of the floor, generating a response to the stresses due to the vehicle's movement.

It is also known from WO-A-2007/130153 an adaptive suspension system for vehicle seat of the passive type, in which there are systems damping the longitudinal vibrations of the seat, suitable for ensuring a position of the seat as still as possible. This system, however, is passive and is not adjustable and controls only the vertical seat's movements.

SUMMARY OF THE INVENTION

The aim of this invention is to provide an adjustable cushioned intermediate system for seat, suitable for controlling the movements of the seat in presence of a person sitting, as to solve the problems mentioned above.

Therefore, the aim of this invention is to achieve the purposes explained above by means of a cushioned intermediate system for seat, according to claim 1.

According to another aspect of the invention, said device is particularly useful when it is used in combination with adjustable shock absorbers and when it is possible to change the dynamics of the response.

The present invention refers in particular to an adjustable cushioned intermediate system for seat, in particular for vehicle seat, as described more fully in the claims, which are an integral part of this description.

BRIEF DESCRIPTION OF THE FIGURES

Further characteristics and advantages of the invention will be more apparent in light of a detailed description of a preferred, but non-exclusive, embodiment of the invention itself, shown with the help of the drawings that are attached hereto, which are merely illustrative and not limitative, in which.

In the drawings the same reference numbers and letters are used to identify the same elements or components.

DETAILED DESCRIPTION OF EMBODIMENTS OF THE INVENTION

According to a preferred embodiment, the cushioned intermediate system of the present invention comprises:
- an upper base plate 2 integral with a seat;
- a lower base plate 1 integral with a vehicle floor;
- at least three shock absorbers placed between said base plates, as to cushion the movement of the upper base plate with respect to the lower base plate;
- a load sensor coupled with each shock absorber;
- at least three actuators placed between said base plates;
- at least one accelerometer A suitable for detecting the kinematics of the seat;
- control means E suitable for controlling said actuators, opposing the oscillations of the seat detected by said accelerometer and by the load weighing on each load sensor.

Figure 1:
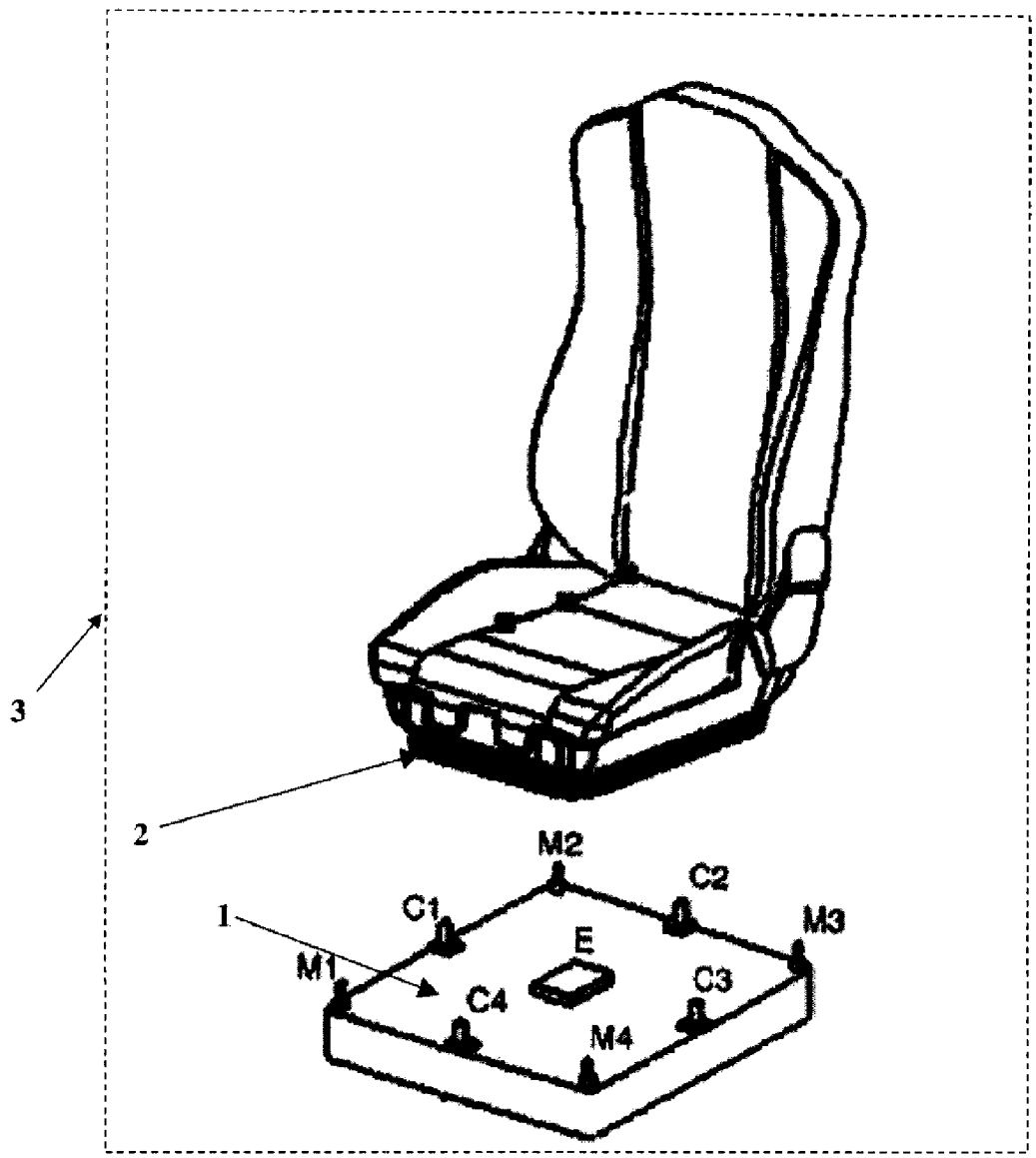
FIG. 1 shows a seat with a cushioned intermediate system according to the invention.

In a preferred embodiment (FIG. 1), the shock absorbers C1, . . . C4 are four and are placed near the middle of the borders of the lower base plate 1.

Said shock absorbers are preferably of the magnetorheological type, namely they able to modify their own mechanical characteristics according to the intensity of the magnetic field applied to the fluid.

Moreover, in said preferred embodiment also the actuators M1, . . . M4 are four and are placed near the corners of the lower base plate 1.

In particular, the actuators may be of the stepper motor type, with a worm screw shaft or of the rack type, so that it is possible to control the height of the seat in a more rapid and precise way.

It is possible to use three separate accelerometers A1, A2 and A3 suitable for detecting the kinematics of the seat according to a common triplet of versors, one for each versor, but it is also possible to use a single component as a triaxial accelerometer.

Advantageously, the intermediate system described above is able to resist to the compression of the shock absorbers C1, C2, C3 and C4, by reacting according to a predetermined dynamics by means of the actuators M1, M2, M3 and M4.

If necessary, an adjusting knob P1 allows the passenger to modify certain operating parameters of the central unit defining said control means E, as to adjust the response speed and the amplitude of seat oscillations. In other words, it is possible to modify the active dynamic behaviour of the seat, by controlling the sensibility to the frequency variations of the oscillations.

More in particular, the information obtained from said load sensor is used to counterbalance the forces operating on the seat for a medium-long time, such as, for example, those deriving from a long bend of a viaduct, when the seat tends to side-skid toward the outside of a bend.

On the other hand, the information obtained from said accelerometer is used by the central unit E to compensate the sudden stresses affecting the seat having short duration or ferquency, as to oppose to the high frequency values of the oscillations produced by real situations such as bumpy or paved roads.

Moreover the control of the response may be a function of the vehicle speed.

The system is also provided with a filter function which determines a damped real response curve to the detected stresses.

An additional adjusting knob P2 allows the driver to adjust the intensity of said magnetic field produced by the magnetorheological fluid of the shock absorbers, as to modify the passive dynamic behaviour of the seat, making its response to the stresses more or less soft.

The shock absorbers and the actuators are in separate positions, which optimizes the behaviour of the actuators, because the weight of the seat added to that of the driver is balanced by the shock absorber's action. The actuators have the only function to dynamically move the load, so that the system is more rapid and precise.

The different behaviours of the seat according to the stresses applied, that is the kind of stresses that the system is able to control, are the following:

vibrations according to a vertical axis:
all the actuators work together to impart an acceleration, having the opposite sign of that of the vibrations, to the base plate 2 integral with the seat, in particular the actuators must be able to impart an acceleration up to 1.5 m/s$^2$;

longitudinal pitching of the vehicle:
the front actuators M1 and M4 move in the same direction but opposite to the rear M2 and M3, as to oppose the forward sliding of the passenger's pelvis during the decelerations of the vehicle and as to compensate the compression of the seat's back during the longitudinal accelerations, for example up to a value of 0.4 m/s$^2$;

transversal rolling of the vehicle:
the lateral actuators M1 and M2 move in the same direction but opposite to the actuators M3 and M4 on the other side, as to oppose the lateral oscillations of the vehicle and the consequent lateral sliding of the passenger's pelvis, for lateral accelerations up to 0.6 m/s$^2$.

Consequently each actuator is independently controlled, as a sum of the effects of the different controls. The system produces an active control also because it reacts to the sum of the effects of the oscillations produced by the pressure levels of the tyres, by the vehicle suspensions, by the cabin suspensions, and by the seat suspensions.

The dynamic characteristics of the response of the intermediate system may be changed by the manufacturer, according to the dynamic characteristics of the cabin where the seat is placed, and/or they may be adjusted by the passenger as to adapt them to his/her own comfort needs. The adjusting methods may be easily developed by the person skilled in the art of the automatic controls.

Figure 3:
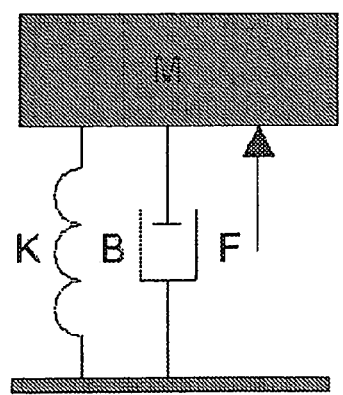
FIG. 3 shows a model of dynamic behaviour of the system.

With reference to the model in FIG. 3, the dynamic behaviour of the intermediate system may be expressed by means of a second-order differential equation of the following type:

$$Mw''=-K(w-z)-B(w'-z')+F$$

where M is the suspended mass, comprising seat and driver; w is the position of the suspended mass (w' the first derivative or speed, w'' the second derivative or acceleration); z is the position and z' the speed of the centre of the mass; K is the elastic constant of the spring equivalent to the system; B is the damping factor; F is the active force of the actuator.

The K and B parameter characterise the dynamic behaviour of the passive type of the system, adjustable by means of the adjusting knob P1, while the F parameter characterises the dynamic behaviour of the active type of the system, adjustable by means of the adjusting knob P1. In fact F is a control force which opposes to the passive dynamic movement of the system comprising the seat and the driver.

Figure 2:
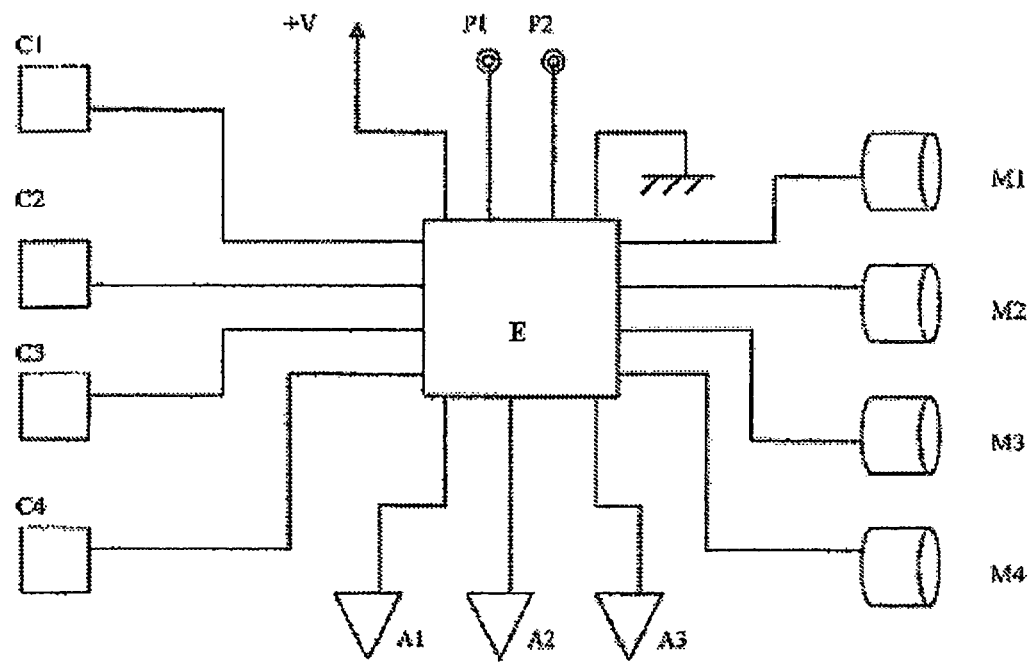
FIG. 2 shows a functional scheme of the interconnection of a control unit with actuators, load sensors, accelerometers, and adjusting knobs.

FIG. 2 shows a functional scheme of the interconnection of the control unit E with said four actuators, with said four load sensors and with three accelerometers A1, A2 and A3. Moreover it shows two potentiometers, or electric equivalents, associated to said adjusting knobs P1 and P2.

It will be apparent to the person skilled in the art that other alternative and equivalent embodiments of the invention can be conceived and reduced to practice without departing from the scope of the invention.

For example, the intermediate system described above may be separated or integrated in the seat or in the body of the vehicle. If it is realized as an independent system it may be used in different types of seats, optimizing the production costs.

From the description set forth above it will be possible for the person skilled in the art to embody the invention with no need of describing further construction details.

The invention claimed is:

1. Adjustable cushioned intermediate system for a vehicle seat, comprising:
    an upper base plate (2) integral with said vehicle seat;
    a lower base plate (1) integral with a vehicle floor;
    characterized in that said system comprises;
    at least four shock absorbers (C) placed between said base plates, and near the middle of the borders of the lower base plate (1), as to cushion the movement of the upper base plate with respect to the lower base plate;
    a load sensor for each of said shock absorbers (C);
    at least four actuators (M) placed between said base plates and mar the corners of the lower base plate (1);
    at least one accelerometer (A) suitable for detecting seat kinematics and oscillations;
    control means (E) suitable for controlling said actuators (M), opposing to the oscillations of the seat detected by said accelerometer and by the load weighing on each load sensor.

2. System according to claim 1, wherein said shock absorbers are magnetoheological fluid shock absorbers.

3. System according to claim 1, wherein said actuators are stepper motor actuators.

4. System according to claim 1, wherein said control means (E) are suitable to use information obtained by said load sensors in order to counterbalance forces acting on the seat, and to use information obtained from said accelerometer in order to compensate sudden stresses affecting the seat when the vehicle is in motion.

5. System according to claim 4, wherein said control means (E) are suitable to control said actuators in an independent way, as to control:

vibrations of said seat according to a vertical axis, wherein all the actuators work together to impart an acceleration opposite of that of said vibrations, to the base plate (2) integral with the seat;

longitudinal pitching of the vehicle, wherein front actuators (M1, M4) of the at least four actuators of the seat move in the same direction but opposite to ream actuators (M2, M3) of the at least four actuators of the seat, as to oppose forward sliding of a passenger's pelvis during decelerations of the vehicle and as to compensate the compression of a seat's back during longitudinal accelerations;

transversal rolling of the vehicle, wherein first side actuators (M1, M2) of the at least four actuators of the seat move in the same direction but opposite to second side actuators (M3, M4) of the at least four actuators of the seat, as to oppose to lateral oscillation of the vehicle.

6. System according to claim 5, wherein the dynamic of the reaction controlled by said control means (E) is adjustable.

7. Seat comprising a system according to claim 1.

8. Vehicle (3) comprising a seat according to claim 7.

* * * * *